(12) United States Patent
Lo

(10) Patent No.: US 12,203,495 B2
(45) Date of Patent: Jan. 21, 2025

(54) INTERCONNECTOR AND A BED USING THE SAME

(71) Applicant: TUNG KENG ENTERPRISE CO., LTD., Taichung (TW)

(72) Inventor: Chiu-Hsiang Lo, Taichung (TW)

(*) Notice: Subject to any disclaimer, the term of this patent is extended or adjusted under 35 U.S.C. 154(b) by 349 days.

(21) Appl. No.: 17/853,935

(22) Filed: Jun. 30, 2022

(65) Prior Publication Data

US 2024/0003371 A1     Jan. 4, 2024

(51) Int. Cl.
| | |
|---|---|
| *F16B 12/56* | (2006.01) |
| *A47C 19/00* | (2006.01) |
| *A47C 19/02* | (2006.01) |
| *A47C 23/06* | (2006.01) |
| *E04B 1/26* | (2006.01) |
| *E04C 3/04* | (2006.01) |
| *F16B 12/00* | (2006.01) |
| *F16B 12/40* | (2006.01) |
| *F16B 12/54* | (2006.01) |
| *F16B 12/58* | (2006.01) |
| *F16B 12/60* | (2006.01) |

(52) U.S. Cl.
CPC ............ *F16B 12/56* (2013.01); *A47C 19/005* (2013.01); *A47C 19/027* (2013.01); *A47C 19/00* (2013.01); *A47C 19/02* (2013.01); *A47C 19/021* (2013.01); *A47C 19/024* (2013.01); *A47C 23/062* (2013.01); *E04B 1/2612* (2013.01); *E04C 2003/046* (2013.01); *F16B 12/00* (2013.01); *F16B 12/40* (2013.01); *F16B 12/54* (2013.01); *F16B 12/58* (2013.01); *F16B 12/60* (2013.01)

(58) Field of Classification Search
CPC .......... F16B 12/00; F16B 12/56; F16B 12/54; F16B 12/58; F16B 12/40; F16B 12/42; F16B 12/60; F16B 9/052; F16B 9/058; F16B 2200/503; F16B 2012/106; F16B 2012/403; F16B 2012/406; A47C 19/021; A47C 19/005; A47C 19/00; A47C 19/02; A47C 19/025; A47C 19/024; A47C 19/027; A47C 19/028; A47C 23/062; A47B 96/061; A47B 96/06; A47B 96/067; A47B 96/068; A47B 96/14; A47B 96/1441; A47B 96/1416; A47B 57/52; A47B 57/56; E04C 2003/046; E04B 1/2612
USPC .......................................... D8/380, 354, 381
See application file for complete search history.

(56) References Cited

U.S. PATENT DOCUMENTS

| | | | | |
|---|---|---|---|---|
| 465,182 | A * | 12/1891 | Lightfoot ............. | A47C 19/025 5/305 |
| 469,081 | A * | 2/1892 | Elliott .................. | A47C 19/028 5/307 |
| 481,628 | A * | 8/1892 | Gribben ............... | A47C 19/025 5/305 |
| 533,659 | A * | 2/1895 | Meyenberg .......... | E04B 1/2612 52/489.1 |

(Continued)

*Primary Examiner* — Justin C Mikowski
*Assistant Examiner* — Morgan J McClure
(74) *Attorney, Agent, or Firm* — Bruce Stone LLP; Joseph A. Bruce

(57) ABSTRACT

An interconnector includes a plate and two pockets. The plate comprising a top and a bottom for contact with a beam. The pockets are formed on the top of the plate. Each of the pockets includes an opening. The openings of the pockets are located on opposite lateral sides of the plate. The openings allow the pockets to receive two bars in parallel to each other in substantially opposite directions.

2 Claims, 6 Drawing Sheets

(56) References Cited

U.S. PATENT DOCUMENTS

| | | | | | |
|---|---|---|---|---|---|
| D25,868 | S | * | 8/1896 | Noyes | D8/380 |
| 693,594 | A | * | 2/1902 | Franks | A47C 19/005 5/200.1 |
| 826,950 | A | * | 7/1906 | MacIlwaine | A47C 19/025 5/238 |
| 864,600 | A | * | 8/1907 | Blacknell | A47C 19/025 5/210 |
| 986,836 | A | * | 3/1911 | Lewis | A47C 19/025 5/210 |
| 1,074,488 | A | * | 9/1913 | Brown | A47C 19/025 5/209 |
| 1,095,169 | A | * | 4/1914 | Sloan | A47C 19/021 5/206 |
| 1,209,195 | A | * | 12/1916 | Orilio | F16B 12/58 5/291 |
| 1,418,699 | A | * | 6/1922 | Collins | E04B 9/16 160/381 |
| 1,433,097 | A | * | 10/1922 | Price | F16B 12/56 5/304 |
| 1,434,352 | A | * | 10/1922 | Ramsay | E04C 5/167 403/395 |
| 1,631,156 | A | * | 6/1927 | Ranney | F16B 9/058 403/189 |
| 1,848,085 | A | * | 3/1932 | Eisenschmidt | F16B 7/0493 D8/380 |
| 2,019,230 | A | * | 10/1935 | Lyon | E04B 2/62 52/289 |
| 2,317,125 | A | * | 4/1943 | Barnett | F16B 9/058 403/190 |
| 2,492,070 | A | * | 12/1949 | Stone | A47C 19/025 5/238 |
| 2,657,399 | A | * | 11/1953 | Rochford | A47C 19/028 5/8 |
| 2,983,931 | A | * | 5/1961 | Nelson | F16B 12/54 5/305 |
| D201,387 | S | * | 6/1965 | Reeves | D8/394 |
| 3,256,030 | A | * | 6/1966 | Banse | E04B 1/2608 52/712 |
| 3,490,393 | A | * | 1/1970 | Nelson | A47B 57/14 182/119 |
| 3,768,106 | A | * | 10/1973 | Fitzgerald | A47C 19/025 5/907 |
| 3,836,270 | A | * | 9/1974 | Chambers | E04B 1/2604 403/205 |
| 3,967,331 | A | * | 7/1976 | Glassman | A47C 23/30 5/244 |
| 3,997,205 | A | * | 12/1976 | MacDonald | E05C 19/18 292/288 |
| 3,999,231 | A | * | 12/1976 | Robins | A47C 19/005 5/176.1 |
| 4,198,175 | A | * | 4/1980 | Knepp | F16B 15/0046 52/289 |
| D256,663 | S | * | 9/1980 | Gilb | D8/380 |
| D260,481 | S | * | 9/1981 | Norcross | D8/394 |
| 4,318,628 | A | * | 3/1982 | Mancini | F16B 12/24 403/231 |
| 4,421,434 | A | * | 12/1983 | Magner | F16B 7/0486 403/205 |
| D281,952 | S | * | 12/1985 | Farmer | D8/394 |
| 4,567,615 | A | * | 2/1986 | Fanti | A47C 23/068 5/191 |
| 4,569,451 | A | * | 2/1986 | Parrott | E04B 1/58 403/232.1 |
| 4,638,517 | A | * | 1/1987 | Yang | A47C 27/144 5/915 |
| 4,729,136 | A | * | 3/1988 | Santo | A47C 19/04 5/280 |
| 4,897,979 | A | * | 2/1990 | Colonias | F16B 9/058 248/248 |
| 5,038,430 | A | * | 8/1991 | Bly | A61G 7/0507 5/430 |
| 5,099,529 | A | * | 3/1992 | Anderson | A47C 19/005 5/400 |
| D329,799 | S | * | 9/1992 | Conklin | D8/331 |
| 5,228,259 | A | * | 7/1993 | Haddad | B62D 33/044 52/653.2 |
| D341,075 | S | * | 11/1993 | Quinkert | D8/354 |
| D355,582 | S | * | 2/1995 | Sleight | D8/380 |
| D364,794 | S | * | 12/1995 | Eberschlag | D8/354 |
| D374,811 | S | * | 10/1996 | Miyashita | D8/382 |
| 5,640,822 | A | * | 6/1997 | Haswell | E04B 7/045 52/712 |
| 6,560,796 | B1 | * | 5/2003 | Diforio | A47C 19/024 5/200.1 |
| 6,701,551 | B1 | * | 3/2004 | Antinori | A47C 27/16 5/236.1 |
| D510,857 | S | * | 10/2005 | Minor | D8/396 |
| D513,171 | S | * | 12/2005 | Richardson | D8/394 |
| D538,634 | S | * | 3/2007 | King | D8/380 |
| 7,458,744 | B2 | * | 12/2008 | Hall | A47B 57/485 403/187 |
| 7,766,576 | B2 | * | 8/2010 | Connell | B23K 31/02 403/399 |
| 7,937,787 | B2 | * | 5/2011 | Whitford | A47C 17/46 5/139 |
| D672,058 | S | * | 12/2012 | Yoder | D25/61 |
| 8,615,935 | B1 | * | 12/2013 | Calini | E04B 7/04 52/93.2 |
| 8,931,123 | B1 | * | 1/2015 | Oh | A47C 23/06 5/280 |
| 8,978,176 | B1 | * | 3/2015 | Oh | A47C 19/12 5/200.1 |
| D732,929 | S | * | 6/2015 | Harrow | D8/354 |
| 9,521,910 | B2 | * | 12/2016 | Thornton | A47C 19/04 |
| D798,135 | S | * | 9/2017 | Doupnik | D8/382 |
| D841,505 | S | * | 2/2019 | Machijima | D10/103 |
| D869,936 | S | * | 12/2019 | Smith | D8/349 |
| 10,702,070 | B2 | * | 7/2020 | Oh | A47C 19/005 |
| 10,939,771 | B2 | * | 3/2021 | Choi | A47C 19/005 |
| 10,966,537 | B1 | * | 4/2021 | Denney | A47C 19/025 |
| D966,077 | S | * | 10/2022 | Fox | D8/354 |
| D972,393 | S | * | 12/2022 | Karlsson | D8/349 |
| 11,672,354 | B1 | * | 6/2023 | Chen | F16B 12/60 5/296 |
| 2004/0129845 | A1 | * | 7/2004 | Whale | E04B 1/2612 52/708 |
| 2006/0191071 | A1 | * | 8/2006 | Polevoy | A47C 19/005 5/201 |
| 2012/0297538 | A1 | * | 11/2012 | Rothschild | A47C 19/005 5/282.1 |
| 2013/0133284 | A1 | * | 5/2013 | Powers, III | E04C 3/07 29/897.35 |
| 2013/0232758 | A1 | * | 9/2013 | Pond | F16B 7/185 403/361 |
| 2013/0247499 | A1 | * | 9/2013 | Zimmerman | E04B 1/388 52/582.1 |
| 2014/0208506 | A1 | * | 7/2014 | Bartelsmeyer | A47C 19/005 5/400 |
| 2015/0208811 | A1 | * | 7/2015 | Polevoy | A47C 19/025 5/200.1 |
| 2017/0013968 | A1 | * | 1/2017 | Bartelsmeyer | A47C 19/12 |
| 2018/0014655 | A1 | * | 1/2018 | Choi | A47C 19/025 |
| 2018/0332975 | A1 | * | 11/2018 | Choi | F16C 11/04 |
| 2018/0344041 | A1 | * | 12/2018 | Liu | A47C 19/025 |
| 2019/0099006 | A1 | * | 4/2019 | Gerig | A47C 23/06 |
| 2020/0378426 | A1 | * | 12/2020 | Choi | A47C 19/025 |
| 2021/0025423 | A1 | * | 1/2021 | Choi | A47C 19/202 |
| 2021/0045537 | A1 | * | 2/2021 | Leng | A47C 19/126 |
| 2022/0053941 | A1 | * | 2/2022 | Chen | A47C 19/005 |
| 2022/0160138 | A1 | * | 5/2022 | Sikeler | F16B 12/40 |
| 2022/0213913 | A1 | * | 7/2022 | Choi | A47C 19/021 |
| 2023/0165380 | A1 | * | 6/2023 | Chung | A47C 19/122 5/200.1 |
| 2023/0180939 | A1 | * | 6/2023 | Youngdo | F16B 12/56 5/282.1 |

* cited by examiner

INTERCONNECTOR AND A BED USING THE SAME

BACKGROUND OF INVENTION

1. Field of Invention

The present invention relates to a bed and, more particularly, to an interconnector used in a bed.

2. Related Prior Art

A typical bed includes longitudinal bars and transverse bars. Conventionally, the bed further includes straight metal plates, bent metal plates, and the screws for interconnecting the longitudinal and transverse bars. The bed includes a large amount of parts. It requires a complicated process to assemble the bed. Hence, the assembly of the bed is inefficient. Some of the parts of the conventional bed such as the screws and the metal plates are small and can easily be lost.

Alternatively, tenons and mortises are used instead of the metal plates and the screws. For example, each of the longitudinal bars is made with mortises, and each of the transverse bars is made with tenons. Each of the tenons of each of the transverse bars is fitted in each of the mortises of each of the longitudinal bars. It is troublesome to keep in the longitudinal and transverse bars in position relative to one another to fit the tenons in the mortises. Hence, the assembly of the bed is inefficient.

The present invention is therefore intended to obviate or at least alleviate the problems encountered in the prior art.

SUMMARY OF INVENTION

It is the primary objective of the present invention to provide an interconnector for a bed that includes a beam and two bars in perpendicular to the beam.

To achieve the foregoing objective, the interconnector includes a plate and two pockets. The plate comprising a top and a bottom. The pockets are formed on the top of the plate. Each of the pockets includes an opening. The openings of the pockets are located on opposite lateral sides of the plate. The openings allow the pockets to receive the bars, which are in parallel to each other in substantially opposite directions. The bottom of the plate is used for contact with the beam.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
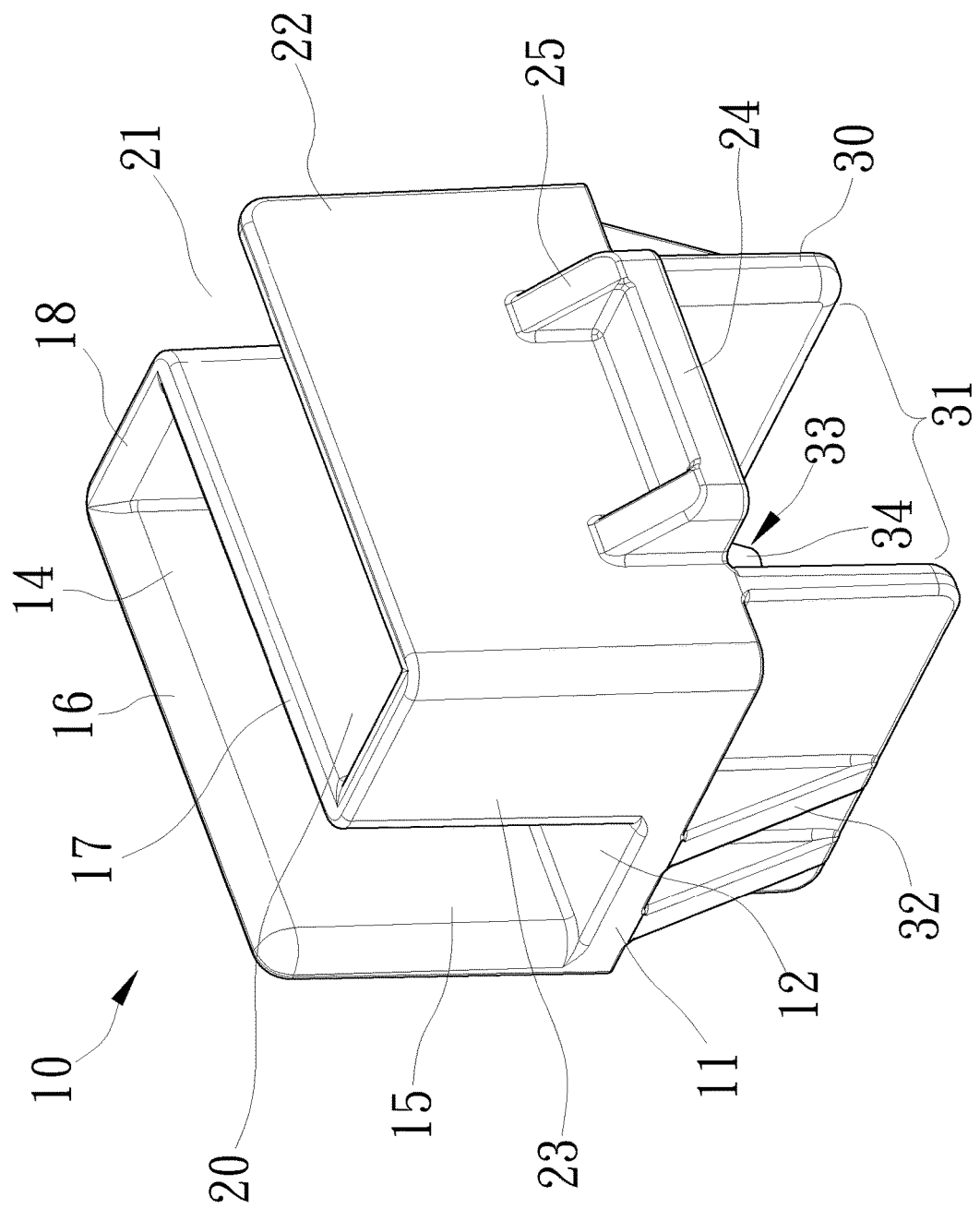
FIG. 1 is a perspective view of an interconnector according to the preferred embodiment of the present invention.
Figure 6:
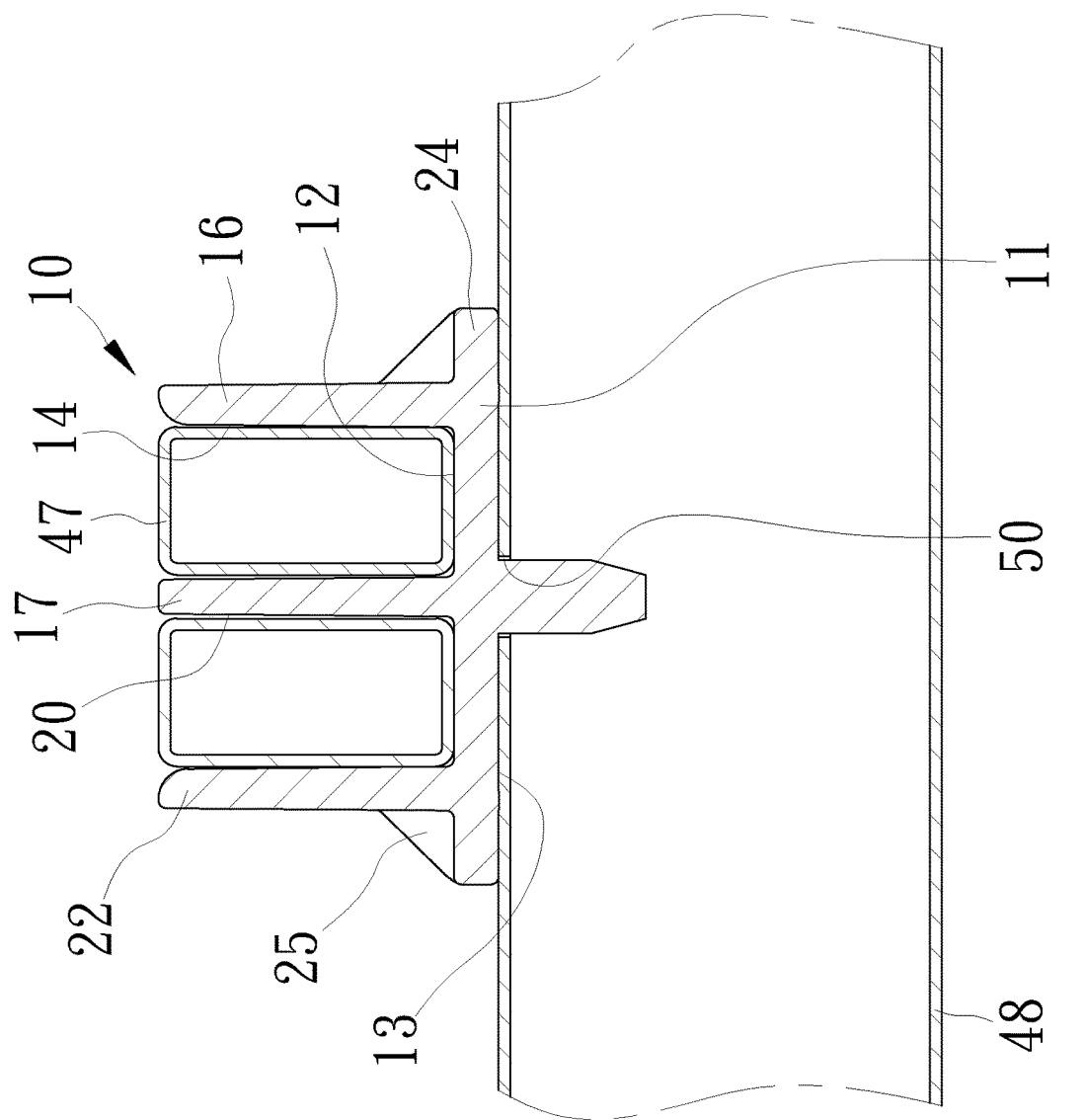
FIG. 6 is another cross-sectional view of the interconnector and the longitudinal and transverse bars shown in FIG. 4.

Referring to FIGS. 1 and 6, an interconnector 10 includes a plate 11, two pockets 14 and 20 on the plate 11, and a receiving portion 31 beneath the plate 11 according to the preferred embodiment of the present invention. The plate 11 is formed with a top 12 and a bottom 13. Two upper walls 16 and 22 and a partition 17 extend from the top 12 of the plate 11. The upper walls 16 and 22 and the partition 17 extend in parallel to one another. The partition 17 is located between the upper walls 16 and 22.

A first restraint 18 extends from the top 12 of the plate 11, closing a rear end of a gap between the first upper wall 16 and the partition 17. Thus, the first upper wall 16, the partition 17 and the first restraint 18 together provide the first pocket 14. Moreover, the first pocket 14 includes an opening 15 in a front end of the gap between the first wall 16 and the partition 17.

A second restraint 23 extends from the top 12 of the plate 11, closing a front end of a gap between the second upper wall 22 and the partition 17. Thus, the second upper wall 22, the partition 17 and the second restraint 23 together provide the second pocket 20. The second pocket 20 includes an opening 21 at a rear end of the gap between the second upper wall 22 and the partition 17.

Figure 2:
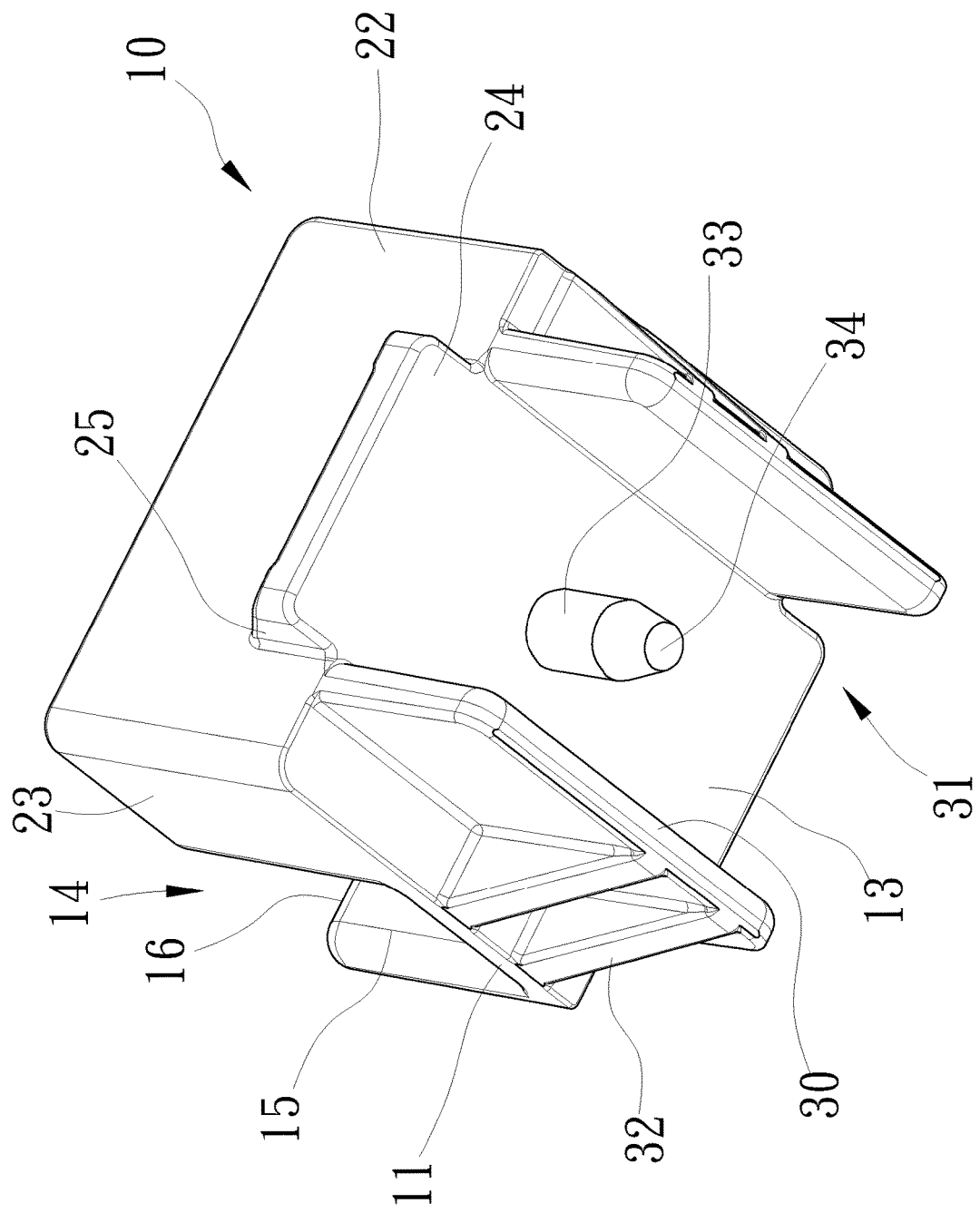
FIG. 2 is another perspective view of the interconnector depicted in FIG. 1.
Figure 5:
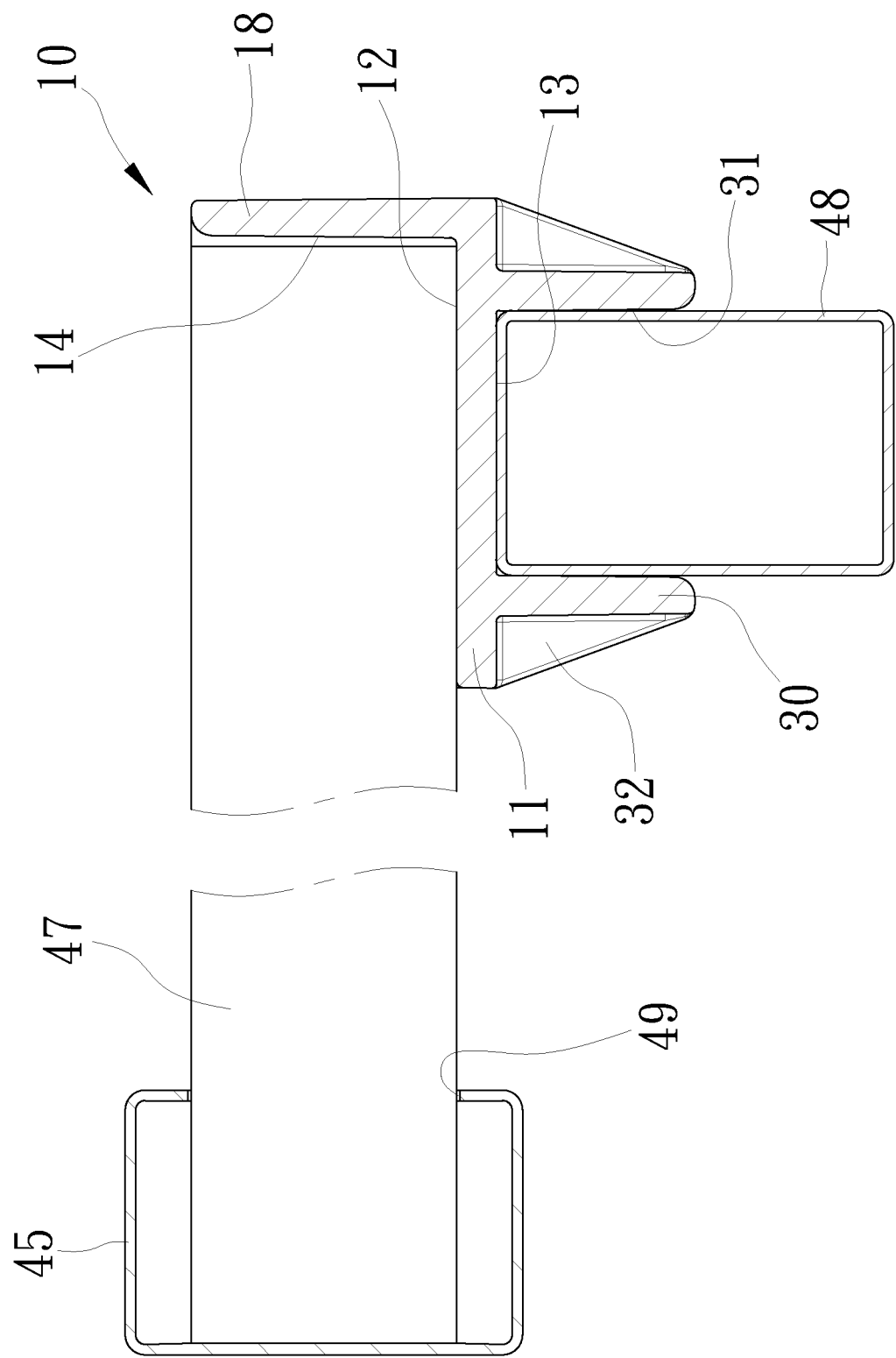
FIG. 5 is a cross-sectional view of the interconnector and the longitudinal and transverse bars shown in FIG. 4.

Referring to FIGS. 2, 5 and 6, two lower walls 30 extending from the bottom 13 of the plate 11. Thus, the lower walls 30 is separated from each other by a gap, thereby providing the receiving portion 31. There are two reinforcing portions 32 at an angle defined by the bottom 13 of the plate 11 and an external face of each of the lower walls 30. The reinforcing portions 32 reinforce the strength of the lower walls 30, which extend from the bottom 13 of the plate 11.

A pin 33 extends from a center of the bottom 13 of the plate 11, i.e., the pin 33 is at a same distance from the lower walls 30. The pin 33 is formed with a conical end 34.

Two fins 24 extend from two opposite flanks of the plate 11. Each of the fin 24 includes a bottom (not numbered) extending in a same plane with the bottom 13 of the plate 11. One of the fins 24 is located on an internal side of the first upper wall 16. The remaining one of the fins 24 is located on an external side of the second upper wall 22. There are two reinforcing portions 25 between an angle defined by the plate 11 and each of the fins 24. The reinforcing portions 25 reinforce the strength of the fins 24, which extend from the opposite flanks of the plate 11.

Figure 3:
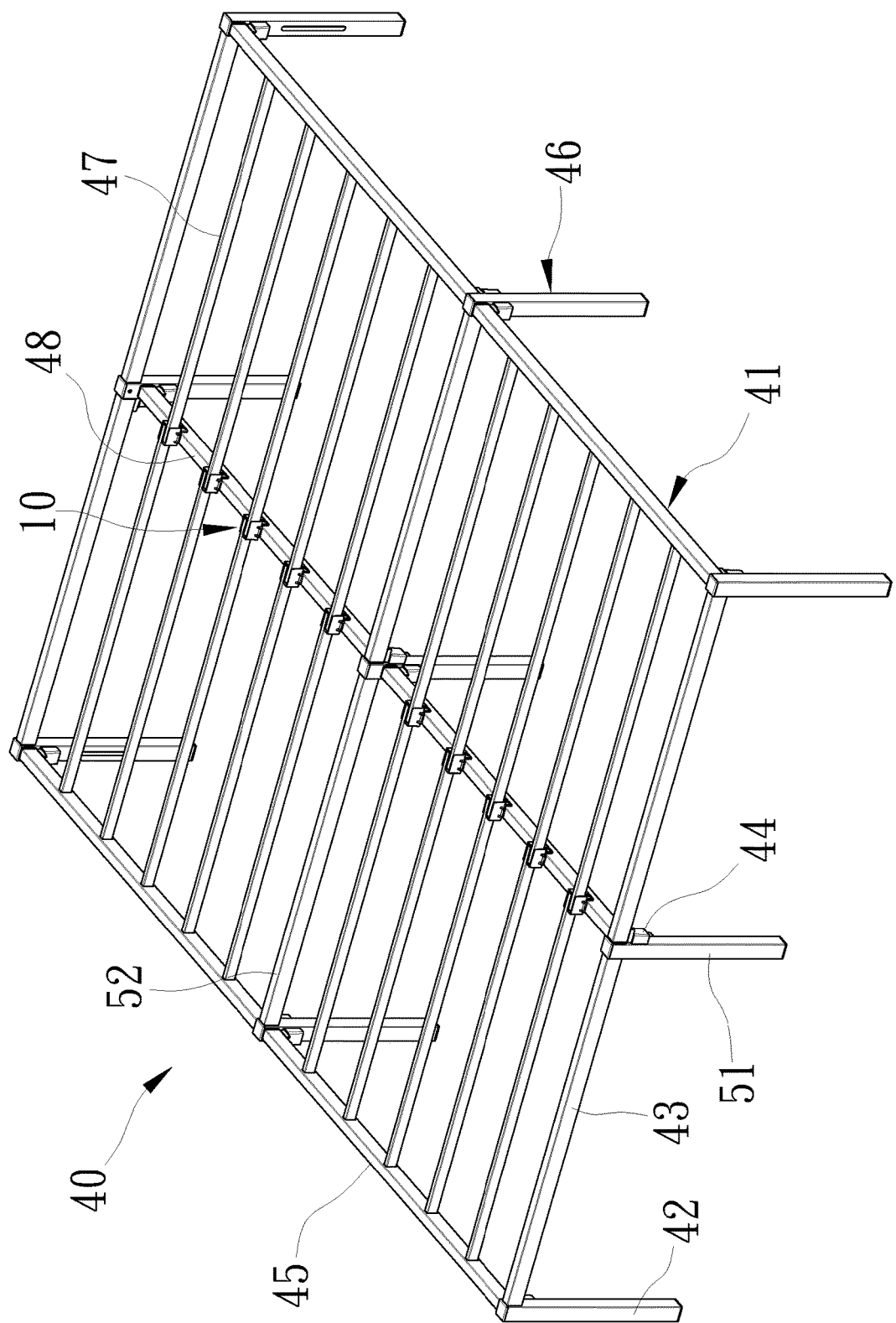
FIG. 3 is a perspective view of a bed using multiple connectors as the one shown in FIGS. 1 and 2.

Referring to FIG. 3, a bed 40 includes a rectangular frame 41, a cruciform structure 46, multiple pairs of transverse bars 47, and multiple posts 42. The rectangular frame 41 includes two transverse beams 43 and two longitudinal beams 45 connected to one another. Each of the transverse and longitudinal beams 43 and 45 preferably consists of two sections connected to each other with a joint 44 that consists of a tenon and a mortise for example. The rectangular frame 41 four corners each of which is connected to an upper end of a corresponding one of the posts 42.

The cruciform structure 46 includes an intermediate longitudinal beam 48, an intermediate transverse bar 52, and a center where the intermediate longitudinal beam 48 is connected to the intermediate transverse bar 52. The intermediate longitudinal bar 48 preferably consists of two sections connected to each other with a joint 44, and so does the transverse bar 52. The intermediate longitudinal bar 48 includes two ends each of which is connected to a middle point of a corresponding one of the transverse beams 43. The intermediate transverse bar 52 includes two ends each of which is connected to a middle point of a corresponding one of the longitudinal beams 45. Each of the ends of the intermediate longitudinal bar 48 is connected to an upper end of a post 51. Each of the ends of the intermediate transverse bar 52 is connected to an upper end of a post 51. The center of the cruciform structure 46 is connected to an upper end of another post 51.

Each pair of transverse bars 47 is interconnected and supported on the intermediate longitudinal beam 48 by one interconnector 10 like the one shown in FIGS. 1 and 2. Hence, the amount of the interconnectors 10 is identical to the amount of the pairs of transverse bars 47.

Figure 4:
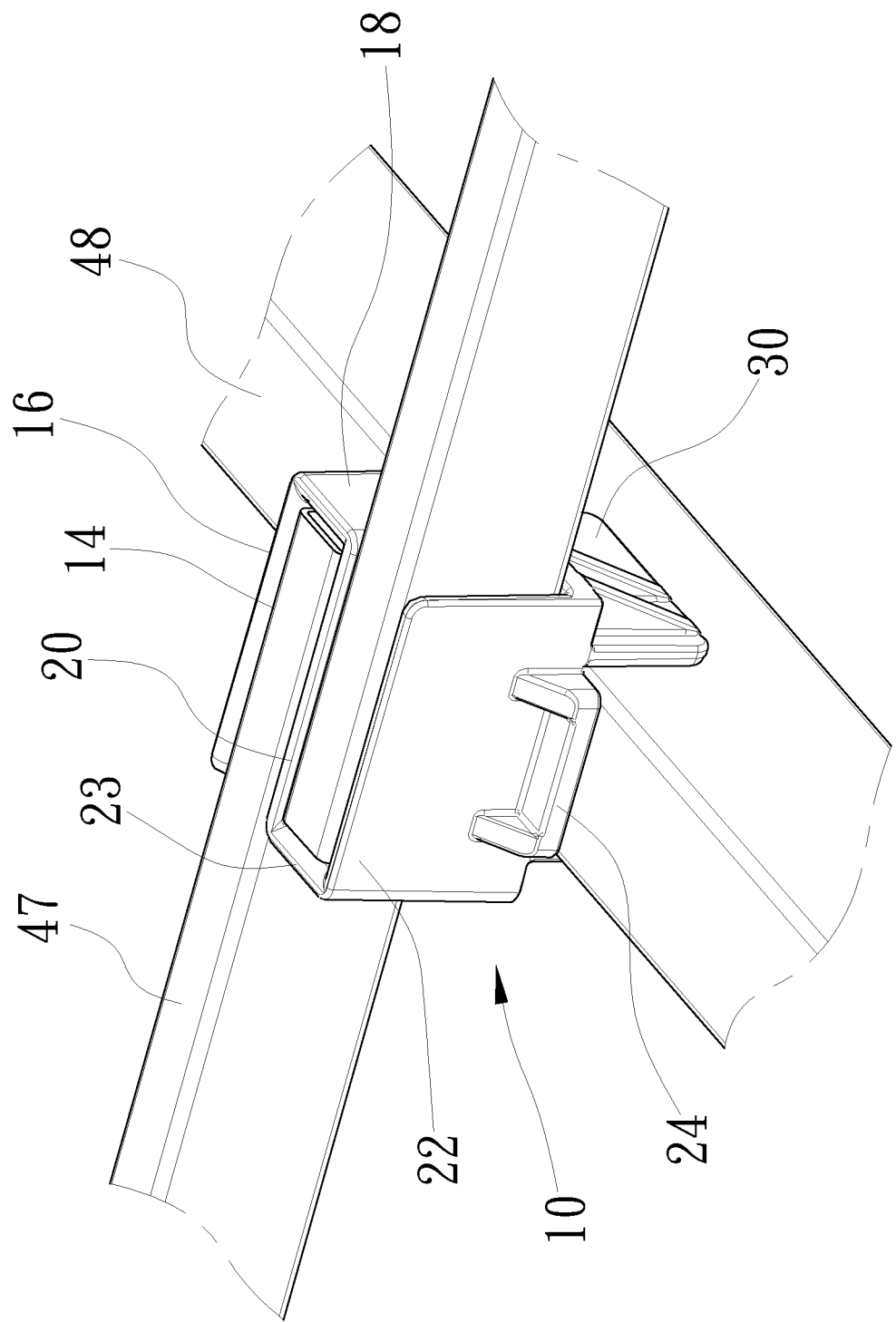
FIG. 4 is an enlarged view of one of the interconnectors interconnecting two transverse bars and a longitudinal bar of the bed shown in FIG. 3.

Referring to FIG. 4 through 6, one interconnector 10 and one pair of transverse bars 47 are shown. A portion of the intermediate longitudinal beam 48 is inserted in the receiving portion 31 of the interconnector 10. The lower walls 30 of the interconnector 10 contact two flanks of the intermediate longitudinal beam 48 to prevent the intermediate longitudinal beam 48 from pivoting relative to the interconnector 10. The pin 33 of the interconnector 10 is inserted in an aperture 50 made in the intermediate longitudinal beam 48, thereby preventing the interconnector 10 from sliding on the intermediate longitudinal beam 48.

The fins 24 are in contact with the intermediate longitudinal beam 48. The fins 24 increase the area of the bottom 13 of the plate 11 in contact with the transverse bar 47. Thus, the risks of the interconnector 10 flipping relative to the transverse bar 47 are reduced.

An end of one of the first transverse bar 47 is inserted in the first pocket 14 of the interconnector 10. An end of the second transverse bar 47 is inserted in the second pocket 20 of the interconnector 10. Thus, the transverse bars 47 are firmly supported on the intermediate longitudinal beam 48 by the interconnector 10.

The openings 15 and 21 are located on two opposite lateral sides of the interconnector 10. Thus, the openings 15 and 21 allow the interconnector 10 to interconnect the transverse bars 47 extending in opposite directions.

Another end of the first transverse bar 47 is inserted in a bore 49 made in a corresponding one of the longitudinal beams 45. Another end of the second transverse bar 47 is inserted in a bore 49 made in another one of the longitudinal beams 45. Thus, the transverse bars 47 are firmly supported on the longitudinal beams 45.

In another embodiment, the interconnector 10 does not include the pin 33. In such a case, the interconnector 10 preferably includes the lower walls.

In another embodiment, the interconnector 10 does not include the lower walls 30. In such a case, the interconnector 10 preferably includes the pin 33.

That is, the interconnector 10 includes the first and second pockets 14 and 20 and the lower walls 30 or the pin 33. The pair of lower walls 30 or the pin 33 is adequate to position the interconnector 10 on the intermediate longitudinal beam 48 without having to use any screw. Hence, the assembly of the bed 40 can easily be assembled.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An interconnector comprising:
    a plate comprising a top and a bottom;
    two pockets formed on the top of the plate, wherein each of the pockets comprises an opening, and wherein the openings of the pockets are located on opposite lateral sides of the plate, wherein the openings allow the pockets to receive two bars in parallel to each other in substantially opposite directions;
    two upper walls formed on the top of the plate;
    a partition formed on the top of the plate between the upper walls, wherein the partition and each of the upper walls together provide a corresponding one of the pockets; and
    two fins extending from the plate, wherein each of the fins comprises a bottom extending in a same plane with the bottom of the plate.

2. The interconnector according to claim 1, wherein the fins extend beyond the upper walls.

* * * * *